United States Patent Office 3,652,692
Patented Mar. 28, 1972

3,652,692
PROCESS FOR THE PREPARATION OF MIXTURES OF CHLOROFLUORINATED DERIVATIVES OF METHANE, CONTAINING MONOCHLORO-DI-FLUOROMETHANE
Martino Vecchio, Milan, and Italo Cammarata, Bollate, Italy, assignors to Montecatini Edison S.p.A., Milan, Italy
No Drawing. Filed July 10, 1969, Ser. No. 840,855
Claims priority, application Italy, July 11, 1968, 18,825/68
Int. Cl. C07c 17/10, 17/20
U.S. Cl. 260—653.7                            18 Claims

ABSTRACT OF THE DISCLOSURE

Mixture of chlorofluorinated derivatives of methane containing chlorodifluoromethane are prepared by chlorofluorinating methane, in the vapor phase, with $Cl_2$ and HF, in the presence of a recycling mixture of chlorinated and chlorofluorinated hydrocarbons, and of a solid fluorination catalyst.

Chlorofluorinated derivatives of methane in general find utility as refrigerating liquids. More particularly, monochloro-difluoromethane is pyrolyzable to tetrafluoroethylene which can be polymerized to polytetrafluoroethylene.

PRIOR ART

Several processes for obtaining chlorofluorinated derivatives of methane containing one hydrogen atom are known in the art.

Some of those processes, in which one operates in a liquid phase, consist essentially in reflux boiling mixtures of HF and $CHCl_3$, at pressures above atmospheric pressure, and in the presence of Sb and As halides.

Other of the known processes are carried out in the vapor phase, and consist essentially in reacting HF and $CHCl_3$ in the presence of catalysts such as coal, oxides and halides of Al, Fe, Cr, Zr and Th.

In general, the $CHCl_3$ used in the aforementioned processes is obtained by the thermal chlorination of methane, the hydrogenation of $CCl_4$, or by reacting ethyl alcohol with calcium chloride.

These known processes have various drawbacks. One such drawback is that sometimes expensive catalysts which are not readily available have to be used, especially when operating on an industrial scale. Another disadvantage is that the expense involved in the preparation of the chloromethanes used as starting materials affects unfavorably the cost of the overall process of producing the final chlorofluorinated methane derivative.

THE PRESENT INVENTION

An object of this invention is to provide a process for preparing mixtures of chlorofluorinated derivatives of methane containing monochlorodifluoromethane which process is free of the drawbacks associated with the known processes.

Another object is to provide a cheap, simple and efficient process for preparing said mixtures of chlorofluorinated methane derivatives.

These and other objects are achieved by operating according to the process of this invention, which process actually offers considerable advantages.

One advantage of the present process is that it is economical, since methane, which is readily available and of relatively low cost, is used directly as a starting material.

Another advantage of the present process is that it is simple to carry it out and easy to control the reaction.

Still another advantage is that cheap, long-life catalysts are used.

Additional advantages will be apparent from the detailed description of the process of our invention which follows.

In accordance with our invention, $CH_4$ and $Cl_2$ are reacted, on a fluidized bed of inert granular material, in the presence of a recycling mixture of halogenated hydrocarbons, at a temperature of from 350° C. to 500° C., and with a contact time of from 2 to 12 seconds, the molar ratio $Cl_2/CH_4$ being from 2 to 5, and the molar ratio between the recycling mixture and methane being from 1 to 12.

The reaction mixture thus obtained is then reacted with anhydrous HF and a recycle constituted by $CHFCl_2$, while operating with a molar ratio between HF and the fed-in $CH_4$ of from 1 to 4, and a molar ratio between $CHFCl_2$ and fed-in $CH_4$ of from 0.1 to 5.0, and in the presence of a solid catalyst consisting of fluorinated alumina, at a temperature of from 200° C. to 450° C., with a contact time between the reaction mixture and the catalyst of from 0.3 to 6.0 seconds.

The following is a description of a particular embodiment of the invention:

The apparatus used consists of two reactors connected in line with each other through a gas mixer.

The first reactor has two feeding inlets: One at the base, and one on one side which, through a pipe, conveys the fed-in materials towards the center of the fluid bed. Methane and chlorine are introduced at the base of the first reactor, which is filled with inert granular material maintained in the state of a fluidized bed.

Into the fluidized bed there is fed a gaseous mixture having the following composition in percent by weight

|  | Percent |
|---|---|
| $CH_2Cl_2$ | 3–10 |
| $CHCl_3$ | 10–60 |
| $CCl_4$ | 7–50 |
| $CCl_3F$ | 0–65 |
| $C_2Cl_4$ | 0–12 |

The molar ratio between the total quantity, in moles, of said gaseous mixture and the moles of fed-in methane is from 1 to 12.

The reaction temperature is comprised between 350° and 500° C. while the total contact time between the reaction mixture and the inert fluidized bed (in this case defined as the ratio between the volume of the inert filler measured in the quiet state and the volume of gas which flows in one second) is comprised between two and twelve seconds. Thus, this total contact time comprises also the initial contact between $CH_4$ and $Cl_2$, of the stretch of time in which they have not yet come into contact with the recycling mixture and which is comprised between 1 and 3 seconds, but is preferably between 1.5 and 2.5 seconds.

The gases leaving the first reactor pass through a mixer into which the HF and the $CHFCl_2$ are fed in such quantities as to have a molar ratio $HF/CH_4$ fed to the first reactor comprised between 1 and 4, and a molar ratio between $CHFCl_2$ and $CH_4$ fed to the first reactor comprised between 0.1 and 5.0.

The gaseous mixture thus obtained is then fed into the second reactor, containing granular fluorinated alumina placed either in a fluid bed or in a fixed bed. In said second reactor, the reaction is conducted at a temperature comprised between 200° and 450° C.; and for a contact time between the reaction mixture and the catalyst comprised between 0.3 and 6 seconds.

The $CHFCl_2$ fed into the second reactor, together with the HF and the gases coming from the first reactor, is separated by distillation from the mixture of the reaction products. In general it is isolated together with about 4 to 6% by weight of impurities prevailingly consisting of $CHClF_2$, $CCl_2F_2$ and $CCl_3F$. The $CHFCl_2$ may be used pure. However, it may also be conveniently used in admixture with the above mentioned impurities, without further purifications.

The mixture of the reaction products flowing out of the second reactor is substantially constituted by HCl, $CHClF_2$, $CCl_2F_2$, $CHF_3$, $CClF_3$, $CHCl_2F$, $CHCl_3$, $CCl_3F$, $CH_2Cl_2$, $CCl_4$ and $C_2Cl_4$, besides small quantities of other products that may form during the reaction. This mixture is conveyed to a first distilling column, from the bottom of which is separated the mixture which constitutes the recycle which must be fed to the first reactor. From the head of the column, a gaseous mixture is obtained which is fed to a further distilling column in which $CHFCl_2$, in admixture with about 4–6% by weight of $CHClF_2$, $CCl_2F_2$ and $CCl_3F$, is separated from the residual mixture of the reaction products which is obtained from the base of the column, and then, thus admixed, recycled without any further purification.

Both recycles are obtained from the distilling columns in liquid phase and are vaporized before being fed into their respective reaction zones.

From the head of the second distilling column there is obtained, in a gaseous state, the mixture comprising $CHClF_2$, $CCl_2F_2$, $CHF_3$ and $CClF_3$, which is conveyed to a washing system in which it is washed with $H_2O$, and to a subsequent washing with a basic aqueous solution, after which it is conveyed to a condensing and measuring system. By a subsequent distillation the single products in the pure state are then obtained.

In the process according to this invention the starting materials, chlorine and methane, are fed in with a molar ratio $Cl_2/CH_4$ comprised between 2 and 5, but preferably between 2 and 3.

The molar ratio between HF and the methane supplied to the base of the first reactor is comprised between 1 and 4, but preferably between 2 and 3.

The gaseous mixture which forms the first recycle and which is fed into the first reactor, consists of $CH_2Cl_2$, $CHCl_3$, $CCl_4$, $CCl_3F$, $C_2Cl_4$, and has about the following composition in percent by weight:

|  | Percent |
|---|---|
| $CH_2Cl_2$ | 3–10 |
| $CHCl_3$ | 10–60 |
| $CCl_4$ | 7–50 |
| $CCl_3F$ | 0–65 |
| $C_2Cl_4$ | 0–12 |

This mixture is previously prepared in a quantity sufficient to start the reaction. Once the reaction has started, it is obtained continuously by the distillation of the reaction products mixture.

The mixture is obtained in liquid phase and, after vaporizing, is recycled back into the first reactor. The ratio between the total number of moles of said recycle mixture and the number of moles of the $CH_4$ fed to the first reactor, is comprised between 1 and 12, but preferably between 2.5 and 10.

The $CHFCl_2$, which constitutes the second recycle, is fed into the second reactor with a molar ratio with respect to the $CH_4$ fed into the first reactor comprised between 0.1 and 5, but preferably between 0.5 and 5.

The catalyst present in the second reaction zone consists of granular fluorinated alumina whose granulometric distribution is not critical and may be comprised within a very wide range. However, when the catalyst is placed on a fluid bed, said granulometry must be such as to allow the fluidization.

The temperature of the reaction between $Cl_2$, $CH_4$ and the first recycle is comprised between 350° and 500° C., but preferably between 380° and 450° C., while the temperature of the reaction between the mixture of the gases flowing out of the first reactor, the HF and the $CHFCl_2$, is comprised between 200° and 450° C., but preferably between 220° and 400° C.

The contact time between methane and chlorine and the inert filler material before the recycling mixture is admixed with them, is comprised between 1 and 3 seconds, but preferably between 1.5 and 2.5 seconds.

The total contact time between the $CH_4$, $Cl_2$ and said filling material, comprising both the period preceding, and the period subsequent to the addition of the recycle mixture, is comprised between 2 and 12 seconds, but preferably between 4 and 7 seconds.

In this case the contact time is defined as the ratio between the volume of the inert filler and the volume of gas which flows into the reactor in one second. The contact time between the gaseous mixture, constituted by the gases flowing out of the first reactor, the HF and the $CHFCl_2$, with the catalyst, is defined as the ratio between the volume of the catalyst and the volume of gas that flows into the reactor in one second.

In the process of this invention, this ratio is comprised between 0.3 and 6 seconds, but preferably between 2 and 5 seconds.

The following examples are given to more clearly illustrate the invention and are not intended as limiting.

Example 1

A gaseous mixture consisting of chlorine and methane in a molar ratio of 2.7:1 was fed through the bottom of a fluid bed metal reactor of a cylindrical shape and arranged vertically, and which contained an inert filler consisting of 1000 cc. (gr. 1440) of Superbrite 3M glass spheroids (Minnesota Mining Manufacturing Co.), having a granulometric size of 100 mesh (Tyler series), supported on a porous metal plate.

At about 15 cm. distance from said porous plate, which distance corresponded to about 3.33 seconds of contact time between $Cl_2$ and $CH_4$ and said inert filler, and after vaporization, a recycling mixture was fed through a conduit directly into the fluid bed, in a molar ratio, with respect to the fed-in methane, of 3:3:1.

Said recycle mixture had about the following composition in percent by weight:

|  | Percent |
|---|---|
| $CH_2Cl_2$ | 5 |
| $CHCl_3$ | 19 |
| $CCl_4$ | 14 |
| $CFCl_3$ | 56 |
| $C_2Cl_4$ | 6 |

The temperature of the reactor was maintained at 400° C. and the contact times were 3.3 seconds for the mixture $CH_4+Cl_2$, and 4.9 seconds for the mixture resulting after the addition of the recycle. The mixture flowing out of the reactor was then passed into a mixer where it was admixed with a gaseous mixture consisting of HF and $CHFCl_2$, in a molar ratio, with respect to the fed-in $CH_4$, of respectively 2.5:1 and 1:1.

The final mixture thus obtained was then introduced into a second cyclindrical metal reactor with an inside diameter of 50 mm. and a length of 500 mm.

This reactor contained 70 cc. of a catalyst constituted by granular fluorinated alumina having a granulometric size comprised between 42 and 325 mesh (Tyler series).

The temperature of the second reactor was maintained at 325° C. while the contact time between gaseous mixture and the catalyst amounted to 0.46 second.

The gaseous products flowing out of the reactor were then conveyed to a distilling column, from the base of which was separated the liquid mixture, which constituted the first recycle, while the gases flowing out of the head of the column were fed into a second distilling column.

The raw liquid $CHFCl_2$, constituting the second recycle, was separated from the base of the second distilling column, and fed into the above mentioned mixer together with the HF and the gases coming from the first reactor. The reaction products flowed out from the head of the column and were conveyed to a washing column in which they were washed with $H_2O$ and subsequently with an aqueous soda solution. Thereafter, the washed products were condensed and analyzed by means of the gas-chromatographic method. The mixture was then subjected to a further distillation which yielded the pure $CHClF_2$.

The yields, in useful products, calculated with respect to the converted methane were as follows:

|  | Percent |
|---|---|
| $CHF_3$ | 12.9 |
| $CHF_2Cl$ | 50.0 |
| $CF_2Cl_2$ | 37.1 | while the conversions attained were as follows:

|  | Percent |
|---|---|
| $CH_4$ | 76.6 |
| $Cl_2$ | 96.3 |
| HF | 65.7 |

Examples 2 to 20

The examples from 2 to 20 were carried out following the same operational procedures and with the same equipment as described in Example 1. The conditions and data concerning these examples are given in the following tables 1 to 4. In particular, Examples 2 to 15 were carried out with the catalyst placed in a fixed bed, while examples from 16 to 20 were carried out in a fluid bed.

TABLE 1

| Example | 2 | 3 | 4 | 5 | 6 |
|---|---|---|---|---|---|
| Molar ratio $Cl_2/CH_4$ | 2.8 | 2.6 | 3.0 | 2.6 | 2.7 |
| Contact time $CH_4+Cl_2$ (sec.) | 3 | 2.7 | 3 | 2 | 2 |
| Contact time $CH_4+Cl_2$ plus first recycle | 7.5 | 8 | 7 | 6.5 | 6 |
| Composition, percent first recycle: |  |  |  |  |  |
| $CH_2Cl_2$ | 5.3 | 5.3 | 4.1 | 3.8 | 5.2 |
| $CHCl_3$ | 42.4 | 29.8 | 22.5 | 24.1 | 24.1 |
| $CCl_4$ | 46.1 | 27.2 | 30.9 | 27.1 | 17.7 |
| $CCl_3F$ | | 34.5 | 32.4 | 32.4 | 45.5 |
| $C_2Cl_4$ | 6.2 | 3.8 | 9.1 | 3.6 | 7.5 |
| Molar ratio first recycle to $Cl_2/CH_4$ | 3.2/2.8/1 | 3.0/2.6/1 | 3.3/3.0/1 | 3.4/2.6/1 | 3.1/2.7/1 |
| Temperature first reactor (° C.) | 380 | 385 | 386 | 390 | 400 |
| Molar ratio $HF/CHFC_2l/ClH_4$ | 2.4/1.1/1 | 3.1/1.0/1 | 2.8/1.0/1 | 5.0/1.1/1 | 3.2/1.1/1 |
| Temperature second reactor (° C.) | 250 | 230 | 250 | 270 | 330 |
| Catalyst of second reactor | (1) | (1) | (1) | (1) | (1) |
| Type of catalytic bed | (2) | (2) | (2) | (2) | (2) |
| Contact time of mixture's second reactor (seconds) | 1.9 | 2.0 | 2.0 | 1.9 | 2.2 |
| Conversion, percent: |  |  |  |  |  |
| $CH_4$ | 80 | 76 | 81 | 80 | 77 |
| $Cl_2$ | 99 | 100 | 94 | 97 | 95 |
| HF | 78 | 55 | 65 | 32 | 57 |
| Net yield, percent on convert. $CH_4$: |  |  |  |  |  |
| $CHClF_2$ | 30.2 | 39.5 | 38 | 47.4 | 42.4 |
| $CCl_2F_2$ | 34.9 | 35.4 | 39.7 | 15.8 | 27.1 |
| $CHF_3$ | 22.7 | 18.7 | 15.0 | 34.2 | 28.8 |
| $CClF_3$ | 11.6 | 6.2 | 6.9 | 2.6 | 1.7 |

[1] Fluorinated alumina.
[2] Fixed bed.

TABLE 2

| Example | 7 | 8 | 9 | 10 | 11 |
|---|---|---|---|---|---|
| Molar ratio $Cl_2/CH_4$ | 3.5 | 2.8 | 2.4 | 2.6 | 2.8 |
| Contact time $CH_4+Cl_2$ (sec.) | 1.5 | 1.5 | 1 | 1 | 1 |
| Contact time $CH_4+Cl_2$ plus first recycle | 5.5 | 5.5 | 4.5 | 4 | 4 |
| Composition, percent first recycle: |  |  |  |  |  |
| $CH_2Cl_2$ | 4.1 | 6.0 | 4.5 | 4.1 | 6.4 |
| $CHCl_3$ | 35.2 | 25.1 | 35.1 | 32.1 | 43.7 |
| $CCl_4$ | 19.8 | 13.4 | 24.9 | 20.1 | 11.7 |
| $CCl_3F$ | 39.7 | 39.3 | 31.2 | 32.5 | 29.7 |
| $C_2Cl_4$ | 1.2 | 6.2 | 4.3 | 11.2 | 8.3 |
| Molar ratio first recycle to $Cl_2/CH_4$ | 2.9/3.5/1 | 2.8/2.8/1 | 3.1/2.4/1 | 3.1/2.6/1 | 3.3/2.8/1 |
| Temperature first reactor (° C.) | 405 | 410 | 415 | 420 | 420 |
| Molar ratio $HF/CHFCl_2/CH_4$ | 2.6/1.1/1 | 2.1/1.0/1 | 19/1.0/1 | 7.5/1.0/1 | 2.0/1.0/1 |
| Temperature second reactor (° C.) | 260 | 300 | 260 | 310 | 350 |
| Catalyst of second reactor | (1) | (1) | (1) | (1) | (1) |
| Type of catalytic bed | (2) | (2) | (2) | (2) | (2) |
| Contact time of mixture's second reactor (seconds) | 3.1 | 3.3 | 5.3 | 4.1 | 3.2 |
| Conversion, percent: |  |  |  |  |  |
| $CH_4$ | 97 | 82 | 80 | 76 | 81 |
| $Cl_2$ | 98 | 100 | 100 | 96 | 100 |
| HF | 81 | 87 | 10 | 22 | 90 |
| Net yield, percent on convert $CH_4$: |  |  |  |  |  |
| $CHClF_2$ | 29.1 | 43.7 | 64.7 | 64.6 | 33 |
| $CCl_2F_2$ | 52.8 | 37.9 | | 17.7 | 48 |
| $CHF_3$ | 15.1 | 16.0 | 35.3 | 17.7 | 19 |
| $CClF_3$ | 2.3 | 2.3 | | | |

[1] Fluorinated alumina.
[2] Fixed bed.

TABLE 3

| Example | 12 | 13 | 14 | 15 | 16 |
|---|---|---|---|---|---|
| Molar ratio $Cl_2/CH_4$ | 2.7 | 2.9 | 2.7 | 2.9 | 3.0 |
| Contact time $CH_4+Cl_2$ (sec.) | 3 | 2 | 2 | 1 | 3 |
| Contact time $CH_4+Cl_2$ plus first recycle | 8 | 6 | 6.5 | 4 | 8 |
| Composition, percent first recycle: | | | | | |
| $CH_2Cl_2$ | 5.5 | 5.9 | 6.5 | 9.2 | 6.8 |
| $CHCl_3$ | 21.6 | 18.6 | 13.4 | 21.5 | 24.6 |
| $CCl_4$ | 14.9 | 10.3 | 18.7 | 8.7 | 11.7 |
| $CCl_3F$ | 53.3 | 58.4 | 56.3 | 56.7 | 56.9 |
| $C_2Cl_4$ | 4.7 | 6.8 | 5.1 | 3.9 | 0.0 |
| Molar ratio first recycle to $Cl_2/CH_4$ | 3.4/2.7/1 | 3.4/2.9/1 | 3.5/2.7/1 | 2.4/2.9/1 | 3.5/3.0/1 |
| Temperature first reactor (° C.) | 370 | 400 | 395 | 420 | 370 |
| Molar ratio $HF/CHFCl_2/CH_4$ | 5.4/1.0/1 | 4.2/1.0/1 | 1.8/1.0/1 | 2.3/0.9/1 | 2.4/1.0/1 |
| Temperature second reactor (° C.) | 310 | 310 | 280 | 300 | 300 |
| Catalyst of second reactor, mesh | ¹7 | (¹) | ¹>7 | ¹>7 | ¹>100 |
| Type of catalytic bed | (²) | (²) | (²) | (²) | (³) |
| Contact time of mixture's second reactor seconds) | 2.8 | 2.8 | 5.5 | 5.5 | 3.0 |
| Conversion, percent: | | | | | |
| $CH_4$ | 81 | 80 | 79 | 81 | 81 |
| $Cl_2$ | 98 | 96 | 98 | 96 | 98 |
| HF | 31 | 40 | 93 | 79 | 74 |
| Net yield, percent on convert. $CH_4$: | | | | | |
| $CHClF_2$ | 66.7 | 44.2 | 53.0 | 33.1 | 27.3 |
| $CCl_2F_2$ | 27.3 | 46.2 | 38.6 | 46.4 | 57.8 |
| $CHF_3$ | 6.0 | 9.6 | 8.4 | 19.7 | 13.3 |
| $CClF_3$ | | | | 0.7 | 1.5 |

¹ Fluorinated alumina.
² Fixed bed.
³ Fluid bed.

TABLE 4

| Example | 17 | 18 | 19 | 20 |
|---|---|---|---|---|
| Molar ratio $Cl_2/CH_4$ | 2.8 | 2.6 | 2.8 | 2.6 |
| Contact time $CH_4+Cl_2$ (sec.) | 2.5 | 2 | 2.8 | 3 |
| Contact time $CH_4+Cl_2$ plus first recycle | 6 | 6.5 | 7 | 7.5 |
| Composition percent first recycle: | | | | |
| $CH_2Cl_2$ | 5.6 | 5.9 | 6.2 | 5.7 |
| $CHCl_3$ | 19.9 | 17.8 | 23.6 | 20.8 |
| $CCl_4$ | 12.4 | 14.1 | 8.3 | 9.1 |
| $CCl_3F$ | 57.8 | 54.7 | 53.6 | 60.0 |
| $C_2Cl_4$ | 4.1 | 7.4 | 8.3 | 4.4 |
| Molar ratio first recycle to $Cl_2/CH_4$ | 3.2/2.8/1 | 3.1/2.6/1 | 3.2/2.8/1 | 3.3/2.6/1 |
| Temperature first reactor (° C.) | 400 | 395 | 375 | 370 |
| Molar ratio $HF/CHFCl_2/CH_4$ | 2.9/1/1 | 5.2/1.1/1 | 2.0/1/1 | 2.5/1/1 |
| Temperature second reactor (° C.) | 320 | 270 | 250 | 230 |
| Catalyst of second reactor | (¹) | (¹) | (²) | (³) |
| Type of catalytic bed | (⁴) | (⁴) | (⁴) | (⁴) |
| Contact time of mixture's second reactor (seconds) | 1.5 | 2.9 | 0.4 | 0.5 |
| Conversion, percent: | | | | |
| $CH_4$ | 76 | 77 | 78 | 77 |
| $Cl_2$ | 95 | 99 | | |
| HF | 56 | 31 | 86 | 66 |
| Net yield, percent on convert. $CH_4$: | | | | |
| $CHClF_2$ | 47.2 | 60.5 | 31.3 | 50.4 |
| $CCl_2F_2$ | 42.8 | 32.5 | 54.5 | 35.9 |
| $CHF_3$ | 10.0 | 7 | 13.6 | 13.2 |
| $CClF_3$ | | | 0.6 | |

¹ Fluorinated alumina, 100 mesh.
² Fluorinated alumina, 100–325 mesh.
³ Fluorinated alumina, 325 mesh.
⁴ Fluid bed.

As will be apparent, changes and variations in details can be made in practicing the invention, without departing from the spirit thereof. Therefore, we intend to include in the scope of the appended claims all such modifications as will be obvious to those skilled in the art from the description and working examples given herein.

What is claimed is:

1. A process for the preparation of mixtures of chlorofluorinated derivatives of methane containing monochlorodifluoromethane as the major reaction product, in which (1) $CH_4$ and $Cl_2$ are reacted in a fluid bed of inert material, in the presence of a recycle mixture consisting essentially of the halogenated hydrocarbons $CH_2Cl_2$, $CHCl_3$, $CCl_4$, $CCl_3F$ and $C_2Cl_4$, at a temperature of from 350° C. to 500° C., with a contact time of from 2 to 12 seconds, and with a molar ratio $Cl_2/CH$ of from 2 to 5 and a molar ratio between the recycle mixture and $CH_4$ of from 1 to 12; and (2) the reaction mixture thus obtained is reacted with anhydrous HF and a recycle consisting essentially of $CHFCl_2$, in the presence of a solid catalyst consisting of fluorinated alumina, at a temperature of from 200° C. to 450° C., with a contact time between said reaction mixture and the catalyst from 0.3 to 6.0 seconds, and with a $HF/CH_4$ molar ratio of from 1 to 4, and a molar ratio $CHFCl_2/CH_4$ of from 0.1 to 5.0.

2. The process according to claim 1, in which the mixture of halogenated hydrocarbons has the following composition:

|  | Percent by weight |
|---|---|
| $CH_2Cl_2$ | 3 to 10 |
| $CHCl_3$ | 10 to 60 |
| $CCl_4$ | 7 to 50 |
| $CCl_3F$ | 0 to 65 |
| $C_2Cl_4$ | 0 to 12 |

3. The process according to claim 1, in which the reaction of the $Cl_2$, $CH_4$, and mixture of halogenated hydrocarbons is carried out at a temperature of from 350° C. to 500° C.

4. The process according to claim 1, in which the contact time between the $Cl_2$, $CH_4$ and mixture of halogenated hydrocarbons is from 2 to 12 seconds.

5. The process according to claim 1, in that the $Cl_2/CH_4$ molar ratio is from 2 to 5.

6. The process according to claim 1 in that the molar ratio between the mixture of halogenated hydrocarbons and $CH_4$ is from 1 to 12.

7. The process according to claim 1, in that the molar ratio between the HF and $CH_4$ is from 1 to 4.

8. The process according to claim 1, in that the molar ratio between the $CHFCl_2$ and $CH_4$ is from 0.1 to 5.0.

9. The process according to claim 1, in that the reaction between HF, $CHCl_2F$ and the gases from the reaction between $CH_4$, $Cl_2$ and the mixture of halogenated hydrocarbons is carried out at a temperature of from 200° C. to 450° C.

10. The process according to claim 1, in that the contact time between the reaction mixture of (1) and the fluorinated alumina is from 0.3 to 6.0 seconds.

11. The process according to claim 1, in which the reaction of the $Cl_2$, $CH_4$, and mixture of halogenated hydrocarbons is carried out at a temperature of from 380° C. to 450° C.

12. The process according to claim 1, in which the contact time between the $Cl_2$, $CH_4$ and mixture of halogenated hydrocarbons is from 4 to 7 seconds.

13. The process according to claim 1, in which the $Cl_2/CH_4$ molar ratio is from 2 to 3.

14. The process according to claim 1, in which the molar ratio between the mixture of halogenated hydrocarbons and $CH_4$ is from 2.5 to 10.

15. The process according to claim 1, in which the molar ratio between the HF and $CH_4$ is from 2 to 3.

16. The process according to claim 1, in which the molar ratio between the $CHFCl_2$ and $CH_4$ is from 0.5 to 4.0.

17. The process according to claim 1, in which the reaction between HF, $CHCl_2F$, and the gases from the reaction between $CH_4$, $Cl_2$ and the mixture of halogenated hydrocarbons is carried out at a temperature of from 220° C. to 400° C.

18. The process according to claim 1, in which the contact time between the reaction mixture of (1) and the fluorinated alumina is from 2 to 5 seconds.

References Cited
UNITED STATES PATENTS

| | | | |
|---|---|---|---|
| 3,210,430 | 10/1965 | Knight | 260—653.7 |
| 3,442,962 | 5/1969 | Vecchio et al. | 260—653.7 |

DANIEL D. HORWITZ, Primary Examiner

UNITED STATES PATENT OFFICE
CERTIFICATE OF CORRECTION

Patent No. 3,652,692      Dated March 28, 1972

Inventor(s) MARTINO VECCHIO ET AL

It is certified that error appears in the above-identified patent and that said Letters Patent are hereby corrected as shown below:

Col. 6, line 13, Table 1, "Molar ratio $HF/CHFC_2 1/C1H_4$" should read -- Molar ratio $HF/CHFCl_2/CH_4$ --;

col. 7, line 9, "$Cl_2/CH$" should read -- $Cl_2/CH_4$ --;

claims 5 to 10 inclusive, cols. 8 and 9, line 1 of each claim "in that" should read -- in which --.

Signed and sealed this 15th day of May 1973.

(SEAL)
Attest:

EDWARD M. FLETCHER, JR.
Attesting Officer

ROBERT GOTTSCHALK
Commissioner of Patents